US012463321B2

(12) United States Patent
Kim et al.

(10) Patent No.: US 12,463,321 B2
(45) Date of Patent: Nov. 4, 2025

(54) ANTENNA STRUCTURE HAVING A CONDUCTIVE LAYER, AND AN ELECTRONIC DEVICE INCLUDING SAME

(71) Applicant: SAMSUNG ELECTRONICS CO., LTD., Suwon-si (KR)

(72) Inventors: Wonseob Kim, Suwon-si (KR); Byungjoon Kim, Suwon-si (KR); Changwon Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 304 days.

(21) Appl. No.: 18/219,348

(22) Filed: Jul. 7, 2023

(65) Prior Publication Data

US 2023/0352810 A1 Nov. 2, 2023

Related U.S. Application Data

(63) Continuation of application No. PCT/KR2022/000002, filed on Jan. 3, 2022.

(30) Foreign Application Priority Data

Jan. 7, 2021 (KR) ........................ 10-2021-0001766

(51) Int. Cl.
*H01Q 1/22* (2006.01)
*H01Q 1/38* (2006.01)
*H01Q 21/06* (2006.01)

(52) U.S. Cl.
CPC ............ *H01Q 1/2283* (2013.01); *H01Q 1/38* (2013.01); *H01Q 21/065* (2013.01)

(58) Field of Classification Search
CPC ...... H01Q 1/2283; H01Q 1/38; H01Q 21/065; H01Q 1/243; H01Q 21/08; H01Q 21/28
See application file for complete search history.

(56) References Cited

U.S. PATENT DOCUMENTS

2009/0256752 A1 10/2009 Akkermans et al.
2016/0049723 A1 2/2016 Baks et al.
(Continued)

FOREIGN PATENT DOCUMENTS

DE 102019121191 A1 2/2020
JP H06152235 A 5/1994
(Continued)

OTHER PUBLICATIONS

Korean Office Action Issued In KR Application No. 10-2021-0001766; Mail Date Feb. 24, 2025; 13 Pages.
(Continued)

*Primary Examiner* — David E Lotter
(74) *Attorney, Agent, or Firm* — CANTOR COLBURN LLP

(57) ABSTRACT

An antenna structure according to various embodiments is provided and may include a printed circuit board (PCB), a radio frequency integrated circuit (RFIC) disposed at a first surface of the PCB and a first antenna disposed at a second surface of the PCB, parallel to the first surface, and including a plurality of conductive patches. The antenna structure includes a dielectric layer adjacent to the second surface and arranged parallel to the second surface and a conductive layer disposed in the dielectric layer and including a plurality of openings formed in areas corresponding to the plurality of conductive patches, wherein the RFIC transmits/receives a signal having a specified frequency through the first antenna and the conductive layer.

20 Claims, 16 Drawing Sheets

(56) References Cited

U.S. PATENT DOCUMENTS

| | | | | |
|---|---|---|---|---|
| 2016/0351996 | A1 | 12/2016 | Ou | |
| 2018/0358686 | A1 | 12/2018 | Park | |
| 2019/0067221 | A1 | 2/2019 | Lasiter et al. | |
| 2019/0081404 | A1* | 3/2019 | Jeon | H01Q 1/084 |
| 2019/0103653 | A1 | 4/2019 | Jeong et al. | |
| 2019/0237879 | A1 | 8/2019 | Park et al. | |
| 2019/0326672 | A1 | 10/2019 | Lim et al. | |
| 2020/0185826 | A1* | 6/2020 | Park | H01Q 21/08 |
| 2020/0203804 | A1 | 6/2020 | Khripkov et al. | |
| 2020/0313282 | A1 | 10/2020 | Jia | |
| 2020/0326754 | A1 | 10/2020 | Kim et al. | |
| 2020/0412022 | A1 | 12/2020 | Yun et al. | |
| 2021/0013622 | A1 | 1/2021 | Sikes et al. | |
| 2023/0223364 | A1 | 7/2023 | Tsai et al. | |

FOREIGN PATENT DOCUMENTS

| | | | |
|---|---|---|---|
| KR | 20100125948 | A | 12/2010 |
| KR | 20180134528 | A | 12/2018 |
| KR | 20190030311 | A | 3/2019 |
| KR | 20190091731 | A | 8/2019 |
| KR | 20190098529 | A | 8/2019 |
| KR | 20200004870 | A | 1/2020 |
| KR | 20200069827 | A | 6/2020 |
| KR | 20200121151 | A | 10/2020 |

OTHER PUBLICATIONS

International Search Report and Written Opinion for International Application No. PCT/KR2022/000002; International Filing Date Jan. 3, 2022; Date of Mailing May 2, 2022; 57 Pages.

Extended European Search Report corresponding to Application No. EP22736787.7;-1205/4258471; PCT/KR2022000002; Dated Mar. 18, 2024, pp. 9.

* cited by examiner

ANTENNA STRUCTURE HAVING A CONDUCTIVE LAYER, AND AN ELECTRONIC DEVICE INCLUDING SAME

CROSS-REFERENCE TO RELATED APPLICATION(S)

This application is a continuation application, claiming priority under § 365(c), of International Application No. PCT/KR2022/000002 filed on Jan. 3, 2022, which is based on and claims the benefit of Korean patent application number 10-2021-0001766, filed on Jan. 7, 2021, in the Korean Intellectual Property Office, the disclosures of which are incorporated by reference herein in their entireties.

TECHNICAL FIELD

Various embodiments of the disclosure relate to an antenna structure including a conductive layer, and an electronic device including the same.

BACKGROUND ART

To meet the demand for wireless data traffic which has increased since deployment of 4th generation (4G) communication systems, efforts have been made to develop an evolved (e.g., 5th generation (5G) or pre-5G) communication system.

As a part of such efforts, the evolved communication system may be implemented in high frequency bands (e.g., mmWave bands) to accomplish higher data rates. In addition, to decrease high free space loss and increase the transmission distance of radio waves in the high frequency bands, beamforming, massive multiple-input multiple-output (massive MIMO), full dimensional MIMO (FD-MIMO), array antenna, analog beam forming, large scale antenna techniques are discussed in the evolved communication systems.

Meanwhile, the processing performance of electronic devices such as smartphones have recently been improved substantially, and large-area displays are thus preferred to effectively provide various functions. At the same time, requests for compactness of electronic devices for improved portability still exist.

DISCLOSURE OF INVENTION

Technical Problem

Signals having a high frequency (for example, about 20 GHz to about 300 GHz), such as mmWave, have a high degree of rectilinearity, and in order to emit RF signals in the rearward direction of an electronic device, an antenna module may be disposed to emit high-frequency signals from the rear surface of the electronic device. However, the back glass that forms the majority of the rear surface of the electronic device includes a metal layer which may make signal emission difficult.

In addition, in the case of a foldable electronic device, antenna modules may be mounted on lateral and rear surfaces of the electronic device, respectively, due to the limited inner mounting space, but antenna coverages of respective antenna modules may overlap due to such a structure.

According to various embodiments of the disclosure, an antenna structure may include a conductive layer including a circular opening, thereby emitting signals.

Solution to Problem

An antenna structure according to various embodiments of the disclosure may include a printed circuit board (PCB), a radio frequency integrated circuit (RFIC) disposed on a first surface of the PCB, a first antenna disposed on a second surface parallel to the first surface of the PCB, the first antenna including multiple conductive patches, a dielectric layer disposed to be adjacent to the second surface and parallel to the second surface, and a conductive layer disposed on the dielectric layer, the conductive layer including multiple openings formed in a region corresponding to the multiple conductive patches. The RFIC may be configured to transmit/receive signals of a designated frequency through the first antenna and the conductive layer.

An electronic device according to various embodiments of the disclosure may include a housing, a wireless communication circuit disposed inside the housing, and an antenna structure electrically connected to the wireless communication circuit. The antenna structure may include a PCB, an RFIC disposed on a first surface of the PCB, a first antenna disposed on a second surface parallel to the first surface of the PCB, the first antenna including multiple conductive patches, a dielectric layer disposed to be adjacent to the second surface and parallel to the second surface, and a conductive layer disposed on the dielectric layer, the conductive layer including multiple openings formed in a region corresponding to the multiple conductive patches. The wireless communication circuit may be configured to transmit/receive signals in a designated frequency domain through the first antenna and the conductive layer.

Advantageous Effects of Invention

According to various embodiments, an antenna structure may emit signals through a patch antenna and a conductive layer, thereby improving the high-frequency band signal coverage.

According to various embodiments, an antenna structure may prevent emission efficiency degradation due to the housing of an adjacent electronic device, and may improve the peak gain of signal emission through antennas.

BRIEF DESCRIPTION OF DRAWINGS

The above and other advantages and features of this disclosure will become more apparent by describing in further detail embodiments thereof with reference to the accompanying drawings, in which.

MODE FOR CARRYING OUT THE INVENTION

Figure 1:
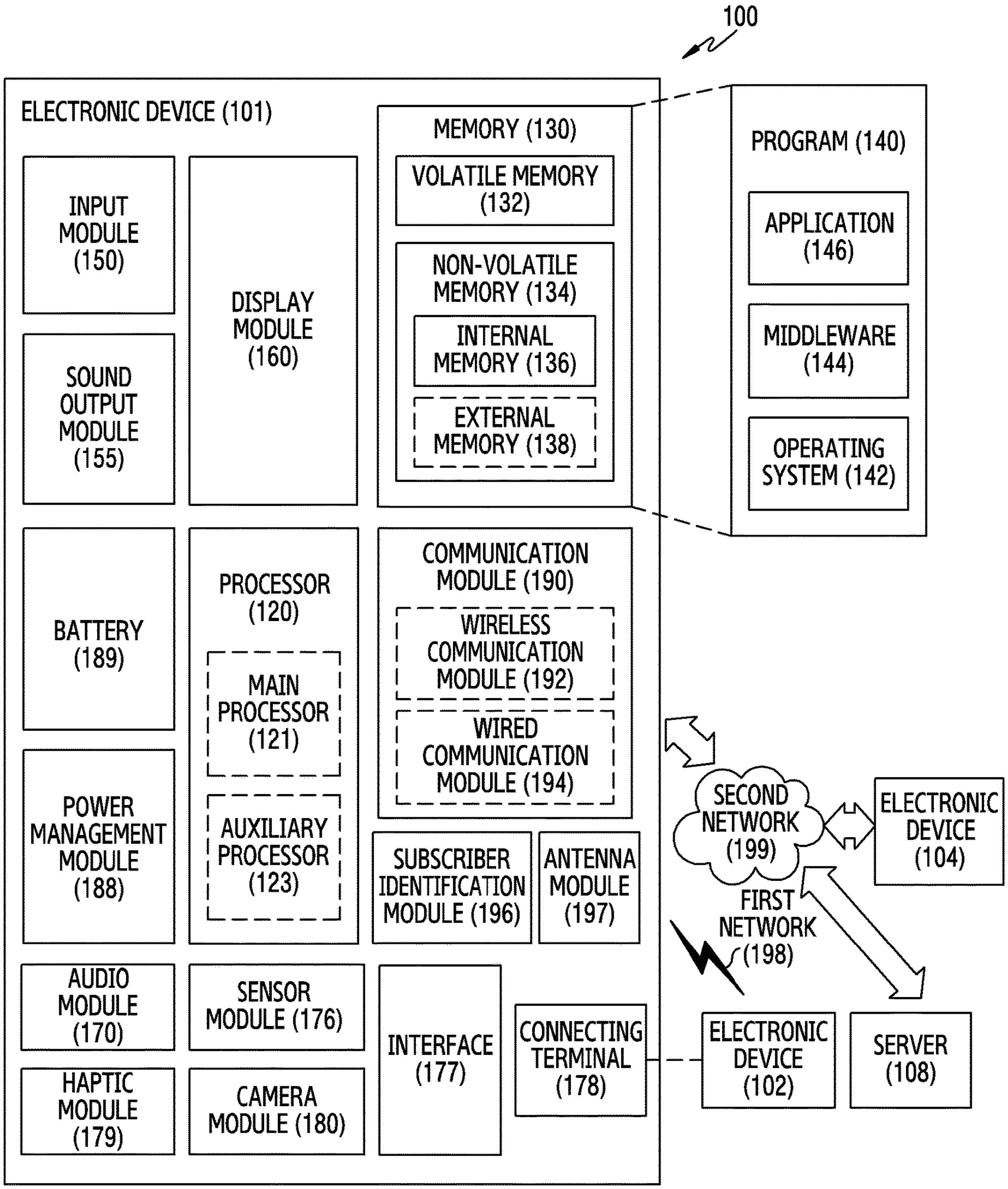
FIG. 1 is a block diagram illustrating an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as a part of another component (e.g., the camera module 180 or the communication module 190) functionally related to the auxiliary processor 123. According to an embodiment, the auxiliary processor (e.g., a neural processing unit (NPU)) may include a hardware structure specific to the processing of an artificial intelligence model. The artificial intelligence model may be generated through machine learning. For example, this learning may be performed by the electronic device 101 itself where artificial intelligence is executed, and may also be performed through a separate server (e.g., the server 108). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. The artificial intelligence model may also include a software structure, in addition to the hardware structure.

The memory 130 may store various data used by at least one component (e.g., the processor 120 and/or the sensor module 176) of the electronic device 101. The various data may include, for example, software (e.g., the program 140) and input data and/or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command and/or data to be used by another component (e.g., the processor 120) of the electronic device 101, from the outside (e.g., a user) of the electronic device 101. The input module 150 may include, for example, a microphone, a mouse, a keyboard, a key (e.g., a button), and/or a digital pen (e.g., a stylus pen).

The sound output module 155 may output sound signals to the outside of the electronic device 101. The sound output module 155 may include, for example, a speaker and/or a receiver. The speaker may be used for general purposes, such as playing multimedia and/or playing recordings. The receiver may be used for receiving incoming calls. According to an embodiment, the receiver may be implemented as separate from, and/or as part of the speaker.

The display module 160 may visually provide information to the outside (e.g., a user) of the electronic device 101. The display module 160 may include, for example, a display, a hologram device, and/or a projector and control circuitry to control a corresponding one of the display, hologram device, and projector. According to an embodiment, the display module 160 may include a touch sensor adapted to detect a touch, and/or a sensor circuit (e.g., a pressure sensor) adapted to measure the intensity of force incurred by the touch.

The audio module 170 may convert a sound into an electrical signal and vice versa. According to an embodiment, the audio module 170 may obtain the sound via the input module 150, and/or output the sound via the sound output module 155 and/or an external electronic device (e.g., an electronic device 102 (e.g., a speaker or a headphone)) directly and/or wirelessly coupled with the electronic device 101.

The sensor module 176 may detect an operational state (e.g., power and/or temperature) of the electronic device 101 and/or an environmental state (e.g., a state of a user) external to the electronic device 101, and then generate an electrical signal and/or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device (e.g., the electronic device 102) directly and/or wirelessly. According to an embodiment, the interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) and/or electrical stimulus which may be recognized by a user via his tactile sensation or kinesthetic sensation. According to an embodiment, the haptic module 179 may include, for example, a motor, a piezoelectric element, and/or an electric stimulator.

The camera module 180 may capture a still image and/or moving images. According to an embodiment, the camera module 180 may include one or more lenses, image sensors, image signal processors, and/or flashes.

The power management module 188 may manage the power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, and/or a fuel cell.

The communication module 190 may support establishing a direct (e.g., wired) communication channel and/or a wireless communication channel between the electronic device 101 and the external electronic device (e.g., the electronic device 102, the electronic device 104, and/or the server 108) and performing communication via the established communication channel. The communication module 190 may include one or more communication processors that are operable independently from the processor 120 (e.g., the application processor (AP)) and supports a direct (e.g., wired) communication and/or a wireless communication. According to an embodiment, the communication module 190 may include a wireless communication module 192 (e.g., a cellular communication module, a short-range wireless communication module, and/or a global navigation satellite system (GNSS) communication module) and/or a wired communication module 194 (e.g., a local area network (LAN) communication module and/or a power line communication (PLC) module). A corresponding one of these communication modules may communicate with the external electronic device 104 via the first network 198 (e.g., a short-range communication network, such as Bluetooth™, wireless-fidelity (Wi-Fi) direct, and/or infrared data association (IrDA)) and/or the second network 199 (e.g., a long-range communication network, such as a legacy cellular network, a 5G network, a next-generation communication network, the Internet, and/or a computer network (e.g., LAN and/or wide area network (WAN)). These various types of communication modules may be implemented as a single component (e.g., a single chip), or may be implemented as multi components (e.g., multi chips) separate from each other. The wireless communication module 192 may identify and/or authenticate the electronic device 101 in a communication network, such as the first network 198 and/or the second network 199, using subscriber information (e.g., international mobile subscriber identity (IMSI)) stored in the subscriber identification module 196.

The wireless communication module 192 may support 5G networks and next-generation communication technologies beyond 4G networks, for example, a new radio (NR) access technology. The NR access technology may support enhanced mobile broadband (eMBB), massive machine type communications (mMTC), and/or ultra-reliable and low-latency communications (URLLC). The wireless communication module 192 may support high-frequency bands (e.g., the mmWave band), for example, in order to achieve a high data transfer rate. The wireless communication module 192 may support various technologies for ensuring performance in high-frequency bands, such as beamforming, massive multiple-input and multiple-output (massive MIMO), full dimensional MIMO (FD-MIMO), array antenna, analog beam-forming, and/or large-scale antenna. The wireless communication module 192 may support various requirements specified in the electronic device 101, an external electronic device (e.g., the electronic device 104), and/or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, and/or U-plane latency (e.g., 0.5 ms or less for each of downlink (DL) and uplink (UL), or a round trip of 1 ms or less) for implementing URLLC.

The antenna module 197 may transmit or receive a signal and/or power to or from the outside (e.g., the external electronic device) of the electronic device 101. According to an embodiment, the antenna module 197 may include an antenna including a radiating element composed of a conductive material and/or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 and/or the second network 199, may be selected, for example, by the communication module 190 from the plurality of antennas. The signal and/or the power may then be transmitted and/or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on or adjacent to a first surface (e.g., the bottom surface) of the printed circuit board and capable of supporting a designated high-frequency band (e.g., the mmWave band), and a plurality of antennas (e.g., an array antenna) disposed on or adjacent to second surface (e.g., the top or side surface) of the printed circuit board and capable of transmitting and/or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), and/or mobile industry processor interface (MIPI)).

According to an embodiment, commands and/or data may be transmitted or received between the electronic device 101 and the external electronic device 104 via the server 108 coupled with the second network 199. Each of the external electronic devices 102 and/or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function and/or the service requested, and/or an additional function and/or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), and/or client-server computing technology may be used, for example. The electronic device 101 may provide ultralow-latency services using, e.g., distributed computing and/or mobile edge computing. In another embodiment, the external electronic device 104 may include an internet-of-things (IoT) device. The server 108 may be an intelligent server using machine learning and/or a neural network. According to an embodiment, the external electronic device 104 and/or the server 108 may be included in the second network 199. The electronic device 101 may be applied to intelligent services (e.g., smart home, smart city, smart car, or healthcare) based on 5G communication technology and/or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, and/or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, and/or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier and/or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), and/or may be distributed (e.g., downloaded or uploaded) online via an application store (e.g., Play Store™), and/or between two user devices (e.g., smart phones) directly. If distributed online, at least part of the computer program product may be temporarily generated and/or at least temporarily stored in the machine-readable storage medium, such as memory of the manufacturer's server, a server of the application store, and/or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, and/or another element may be carried out sequentially, in parallel, repeatedly, and/or heuristically, or one or more of the operations may be executed in a different order or omitted, or one or more other operations may be added.

Figure 2:
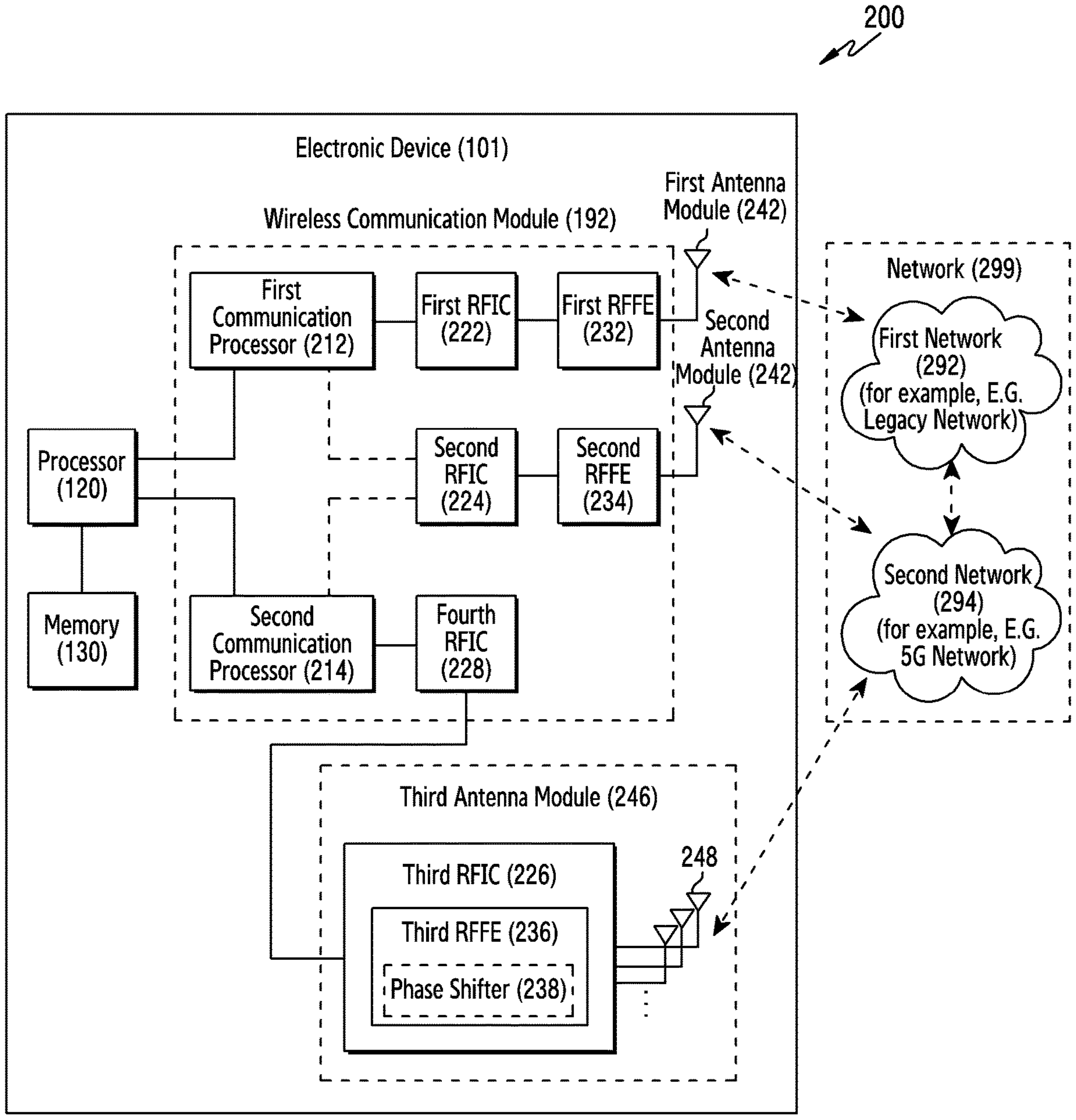
FIG. 2 is a block diagram illustrating an electronic device for supporting legacy network communication and 5G network communication according to various embodiments.

FIG. 2 is a block diagram 200 of an electronic device 101 for supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel According to various embodiments, the first network may be a legacy network including a $2^{nd}$ generation (2G), 3G, 4G, or long-term evolution (LTE) network. The second communication processor 214 may support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined according to 3GPP. Additionally, according to an embodiment, the first communication processor 212 and/or the second communication processor 214 may support establishment of a communication channel corresponding to another designated band (for example, about 60 GHz or less) among bands to be used for wireless communication with the second network 294, and 5G network communication through the established communication channel. According to an embodiment, the first communication processor 212 and/or the second communication processor 214 may be implemented inside a single chip or a single package. According to various embodiments, the first communication processor 212 and/or the second communication processor 214 may be formed inside a single chip or a single package with a processor 120, an auxiliary processor 123, and/or a communication module 190.

During transmission, the first RFIC 222 may convert a baseband signal generated by the first communication processor 212 into a radio frequency (RF) signal of about 700 MHz to about 3 GHz used in the first network 292 (for example, a legacy network). During reception, an RF signal may be acquired from the first network 292 (for example, a legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

During transmission, the second RFIC 224 may convert a baseband signal generated by the first communication processor 212 and/or the second communication processor 214 into an RF signal (hereinafter, referred to as a 5G Sub6 RF signal) in a Sub6 band (for example, about 6 GHz or less) used in the second network 294 (for example, a 5G network). During reception, a 5G Sub6 RF signal may be acquired from the second network 294 (for example, a 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a corresponding communication processor among the first communication processor 212 and/or the second communication processor 214.

The third RFIC 226 may convert a baseband signal generated by the second communication processor 214 into an RF signal (hereinafter, referred to as a 5G Above6 RF signal) in a 5G Above6 band (for example, about 6 GHz to about 60 GHz) to be used in the second network 294 (for example, a 5G network). During reception, a 5G Above6 RF signal may be received from the second network 294 (for example, a 5G network) through an antenna (for example, the antenna 248) and may be preprocessed through the third RFFE 236. The third RFFE 226 may convert the preprocessed 5G Above6 RF signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal (hereinafter, referred to as an IF signal) in an intermediate frequency band (for example, about 9 GHz to about 11 GHz) and may then transfer the IF signal to the third RFIC 226. The third RFIC 226 may convert the IF signal into a 5G Above6 RF signal. During reception, a 5G Above6 RF signal may be received from the second network 294 (for example, a 5G network) through an antenna (for example, the antenna 248) and may be converted into an IF signal by the third RFIC 226. The fourth RFIC 228 may convert the IF signal into a baseband signal such that the second communication processor 214 can process the same.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module among the first antenna module 242 and/or the second antenna module 244 may be omitted or coupled to another antenna module so as to process RF signals in corresponding multiple bands.

According to an embodiment, the third RFIC 226 and the antenna 248 may be disposed on an identical substrate so as to form a third antenna module 246. For example, the wireless communication module 192 or the processor 120 may be disposed on a first substrate (for example, a main PCB). In this case, the third RFIC 226 may be disposed in a partial region (for example, on the lower surface) of a second substrate (for example, a sub PCB) separate from the first substrate, and the antenna 248 may be disposed in another partial region (for example, on the upper surface) thereof, thereby forming a third antenna module 246. By disposing the third RFIC 226 and the antenna 248 on an identical substrate, the length of a transmission line therebetween can be reduced. This may reduce loss (for example, attenuation) of signals in a high-frequency band (for example, about 6 GHz to about 60 GHz) used for 5G network communication, for example, due to the transmission line. Accordingly, the electronic device 101 may improve the quality or speed of communication with the second network 294 (for example, a 5G network).

According to an embodiment, the antenna 248 may be formed as an antenna array including multiple antenna elements which may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal to be transmitted to the outside (for example, a base station of a 5G network) of the electronic device 101 through a corresponding antenna element. During reception, each of the multiple phase shifters 238 may shift the phase of a 5G Above6 RF signal received from the outside through a corresponding antenna element to an identical or substantially identical phase. This enables transmission and/or reception through beamforming between the electronic device 101 and the outside.

The second network 294 (for example, a 5G network) may be operated independently (for example, standalone (SA)) of the first network 292 (for example, a legacy network), and/or operated while being connected thereto (for example, non-standalone (NSA)). For example, the 5G network may have an access network (for example, a 5G radio access network (RAN)) or a next generation RAN (NG RAN)) only, and may have no core network (for example, a next generation core (NGC)). In this case, the electronic device 101 may access the access network of the 5G network and may then access an outer network (for example, the Internet) under the control of the core network (for example, an evolved packed core (EPC)) of the legacy network. Protocol information (for example, LTE protocol information) for communication with the legacy network and/or protocol information (for example, new radio (NR) protocol information) for communication with the 5G network may be stored in the memory 230 and accessed by another component (for example, the processor 120, the first communication processor 212, and/or the second communication processor 214).

Figure 3A:
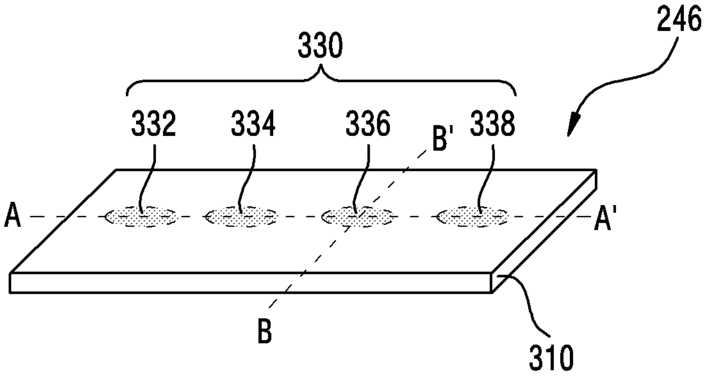
FIG. 3A illustrates an embodiment of one surface of the structure of a third antenna module described with reference to FIG. 2.
Figure 3B:
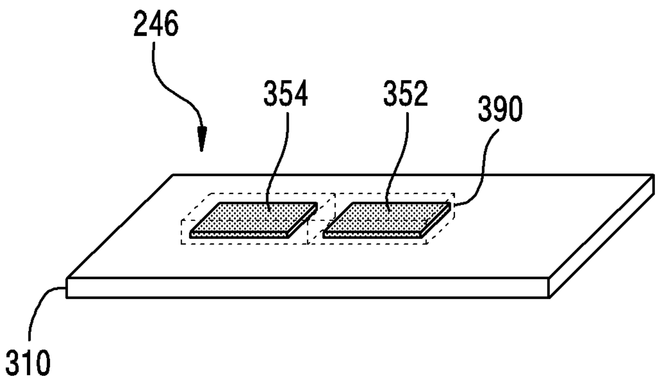
FIG. 3B illustrates another surface of the embodiment of the structure of the third antenna module described with reference to FIG. 2.
Figure 3C:
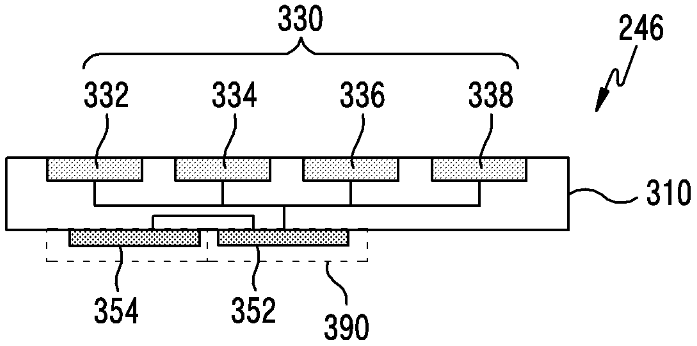
FIG. 3C illustrates a sectional view of the embodiment of the structure of the third antenna module described with reference to FIG. 2.

FIG. 3A, FIG. 3B, and FIG. 3C illustrate an embodiment of the structure of the third antenna module 246 described with reference to FIG. 2, for example. FIG. 3A is a perspective view of the third antenna module 246 seen from one side. FIG. 3B is a perspective view of the third antenna module 246 seen from another side. FIG. 3C is a sectional view of the third antenna module 246 taken along A-A'.

Referring to FIG. 3A, FIG. 3B, and FIG. 3C, in an embodiment, the third antenna module 246 may include a printed circuit board 310, an antenna array 330, a radio frequency integrated circuit (RFIC) 352, a power management integrate circuit (PMIC) 354, and a module interface. Selectively, the third antenna module 246 may further include a shielding member 390. In other embodiments, at least one of the above-mentioned components may be omitted, and/or at least two of the above-mentioned components may be formed integrally.

The printed circuit board 310 may include multiple conductive layers and multiple nonconductive layers laminated alternately with the conductive layers. The printed circuit board 310 may provide electric connection between various electronic components disposed on the printed circuit board 310 and/or the outside by using wires and conductive vias formed on the conductive layers.

The antenna array 330 (for example, 248 in FIG. 2) may include multiple antenna elements 332, 334, 336, and/or 338 disposed to form a directional beam. The antenna elements 332, 334, 336, 338 may be formed on the first surface of the printed circuit board 310 as illustrated. According to another embodiment, the antenna array 330 may be formed inside the printed circuit board 310. According to embodiments, the antenna array 330 may include multiple antenna arrays having identical and/or different shapes and/or types (for example, a dipole antenna array and/or a patch antenna array).

The RFIC 352 (for example, 226 in FIG. 2) may be disposed in another region (for example, on a second surface opposite to the first surface) of the printed circuit board 310, which is spaced apart from the antenna array. The RFIC 352 may be configured to be able to process signals in a selected frequency band, which may be transmitted/received through the antenna array 330. According to an embodiment, during transmission, the RFIC 352 may convert a baseband signal acquired from a communication processor (not illustrated) into an RF signal in a designated band. During reception, the RFIC 352 may convert an RF signal received through the antenna array 330 into a baseband signal and may transfer the same to the communication processor.

According to another embodiment, during transmission, the RFIC 352 may up-convert an IF signal (for example, about 9 GHz to about 11 GHz) received from an intermediate frequency integrated circuit (IFIC) (for example, 228 in FIG. 2) into an RF signal in a designated band. During reception, the RFIC 352 may down-convert an RF signal acquired through the antenna array 330 into an IF signal and may transfer the same to the IFIC.

The PMIC 354 may be disposed in another partial region (for example, on the second surface) of the printed circuit board 310, which is spaced apart from the antenna array. The PMIC may receive a voltage supplied from a main PCB (not illustrated) and may provide various components (for example, the RFIC 352) on the antenna module with necessary power.

The shielding member 390 may be disposed on a part (for example, the second surface) of the printed circuit board 310 to electromagnetically shield at least one of the RFIC 352 or the PMIC 354. According to an embodiment, the shielding member 390 may include a shield can.

Although not illustrated, in various embodiments, the third antenna module 246 may be electrically connected to another printed circuit board (for example, a main circuit board) through a module interface. The module interface may include a connecting member, for example, a coaxial cable connector, a board-to-board connector, an interposer, and/or a flexible printed circuit board (FPCB). Through the connecting member, the RFIC 352 and/or the PMIC 354 of the antenna module may be electrically connected to the printed circuit board.

Figure 4A:
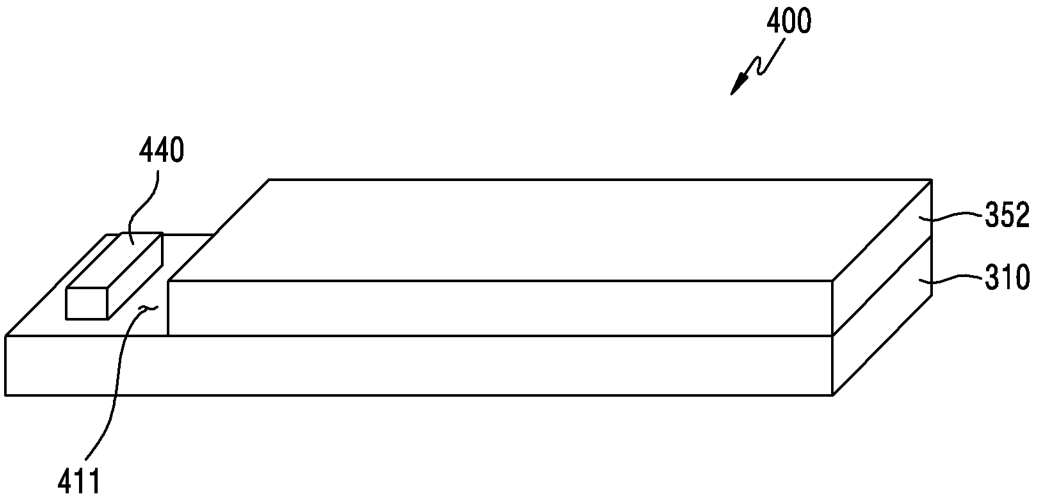
FIG. 4A illustrates an antenna module according to an embodiment and the first surface of a PCB included in the antenna module.
Figure 4B:
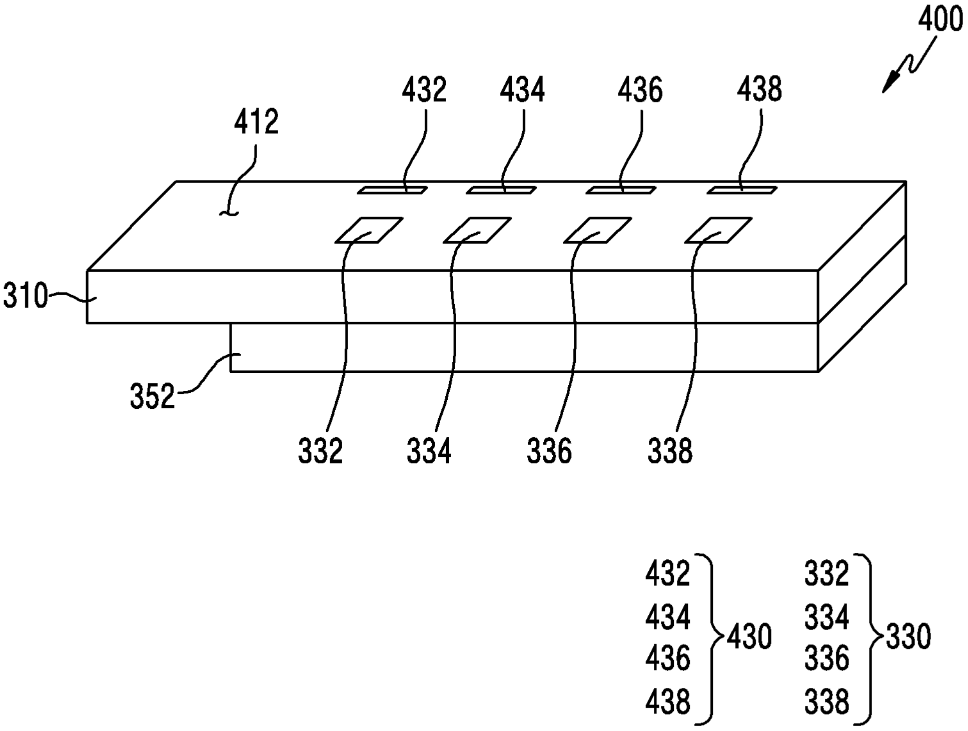
FIG. 4B illustrates an antenna module according to an embodiment and the second surface of a PCB included in the antenna module.

FIG. 4A illustrates an antenna module according to an embodiment and the first surface of a PCB included in the antenna module. FIG. 4B illustrates an antenna module according to an embodiment and the second surface of a PCB included in the antenna module.

Referring to FIG. 4A and FIG. 4B together, the antenna module 400 according to an embodiment may include a printed circuit board (PCB) 310, a radio frequency integrated circuit (RFIC) 352 connected to the PCB 310, at least one antenna array 330 or 430 disposed on the PCB 310, and a connector 440. Components identical or substantially identical to those described above are given identical reference numerals, and repeated descriptions thereof will be omitted herein.

Referring to FIG. 4A, the PCB 310 according to an embodiment may be electrically connected to the RFIC 352. The PCB 310 and the RFIC 352 may be electrically connected through the first surface 411 of the PCB 310. According to another embodiment (not illustrated), the PCB 310 and the RFIC 352 may be connected through an electric connecting member (for example, a flexible printed circuit board (FPCB)).

According to an embodiment, the antenna module 400 may include a connector 440 disposed on the first surface 411 of the PCB 310. According to an embodiment, the antenna module 400 may be electrically connected to at least one electronic component (for example, an intermediate frequency integrated circuit (IFIC), a communication processor (CP)) through the connector 440. For example, the antenna module 400 may be electrically connected to an IFIC (not illustrated) through the connector 440 and an RFIC (not illustrated) connected to the connector 440.

Referring to FIG. 4B, the antenna module 400 according to an embodiment may include at least one antenna array 330 or 430 disposed on a flat second surface 412 which is parallel to the first surface 411 of the PCB 310. The at least one antenna array 330 or 430 may include a first antenna array 330 (for example, the antenna array 330 in FIG. 3) (or a first antenna) and a second antenna array 430 (or a second antenna), respectively. According to an embodiment, the first antenna array 330 and the second antenna array 430 may include multiple antenna elements 332, 334, 336, 338, 432, 434, 436, and 438, respectively. For example, the first antenna array 330 may include a patch antenna including multiple conductive patches, and the second antenna array 430 may include a dipole antenna including multiple conductive patches, but are not limited thereto. The first antenna array 330 according to an embodiment may be referred to as the antenna array 330 in FIG. 3.

According to an embodiment, the RFIC 352 electrically connected to the PCB 310 may control an antenna disposed on the PCB 310 such that signals are emitted. For example, the RFIC 352 may control the first antenna array 330 disposed on the PCB 310 such that signals are emitted in the direction in which the second surface 312 of the PCB 310 faces. The RFIC 352 may control the first antenna array 330 disposed on the PCB 310 such that signals (for example, mmWave signals) in a designated frequency band (for example, 29 GHz or 39 GHz) are transmitted/received.

Figure 5:
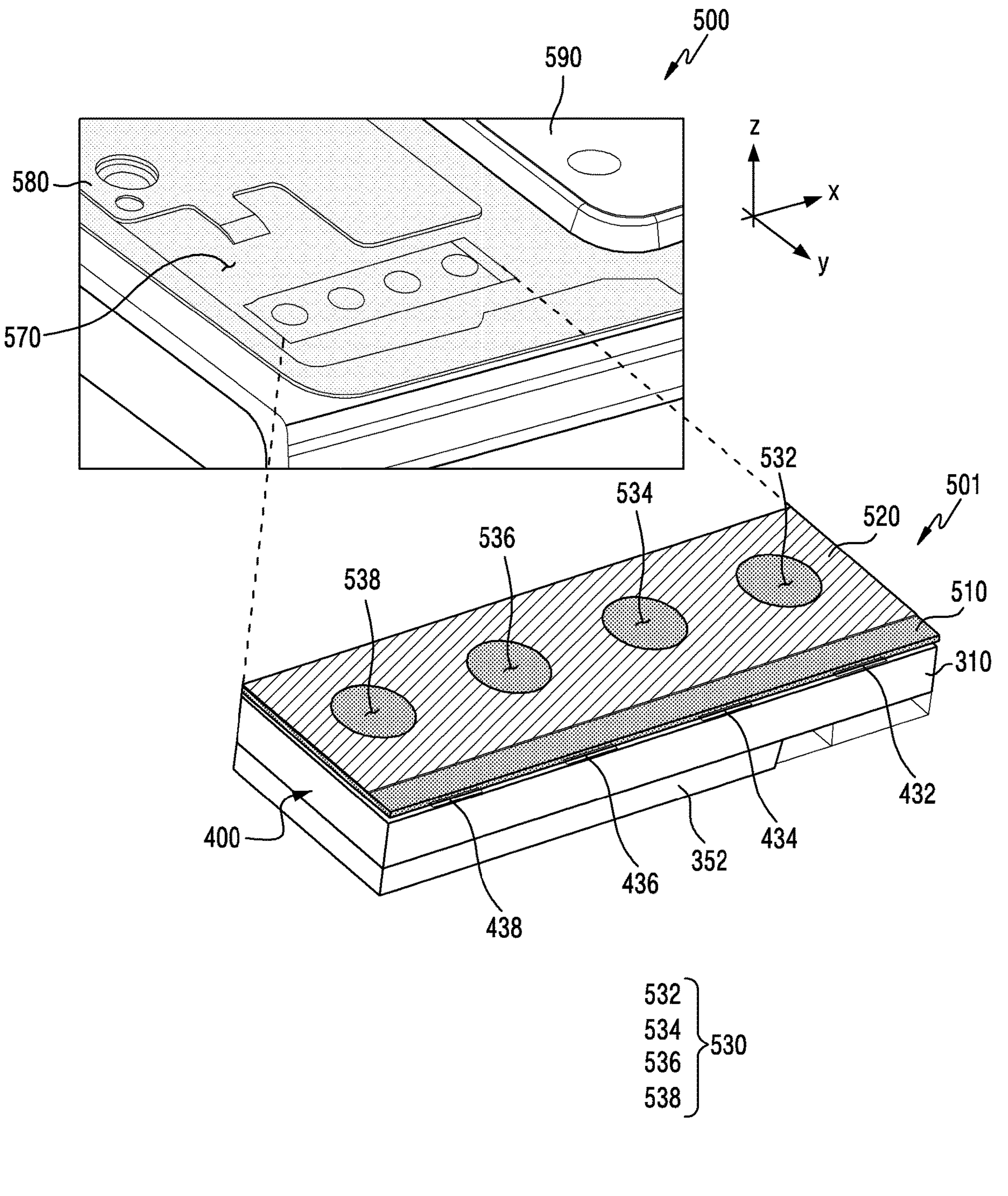
FIG. 5 illustrates an antenna structure mounted on an electronic device according to an embodiment.

FIG. 5 illustrates an antenna structure mounted on an electronic device according to an embodiment.

Referring to FIG. 4A, FIG. 4B, and FIG. 5 together, the antenna structure 501 according to an embodiment may include an antenna module 400, a dielectric layer 510, and a conductive layer 520 disposed on the dielectric layer 510, and may be disposed inside an electronic device 500. Components identical or substantially identical to those described above are given identical reference numerals, and repeated descriptions thereof will be omitted herein.

According to an embodiment, the antenna structure 501 may be disposed adjacent to the rear cover 570 of the electronic device 500. According to an embodiment, the antenna structure 501 may be disposed so as not to overlap the camera structure 590 in a direction perpendicular to the rear cover 570 of the electronic device 500. According to an embodiment, at least a part of the antenna structure 501 may contact the rear cover 570. According to an embodiment, at least a part of the antenna structure 501 may contact the rear cover 570 such that heat generated by at least one component (for example, a power management integrated circuit (PMIC) 354 and/or an RFIC 352) mounted on the PCB 310 is transferred to the rear cover 570.

According to an embodiment, the antenna structure 501 may include a PCB 310, an RFIC 352 connected to the PCB 310, a dielectric layer 510 disposed to be spaced apart from the PCB 310, and a conductive layer 520 which is disposed on the dielectric layer 510, and which may include multiple openings 530.

According to an embodiment, the dielectric layer 510 may include a dielectric material having a permittivity equal to/larger than a predesignated reference value. For example, the dielectric layer 510 may include a dielectric material having a dielectric constant of 5 or larger, but is not limited thereto. According to an embodiment, the dielectric layer 510 (for example, a graphite sheet) may be electrically and/or physically connected to a conductor 580 disposed inside the electronic device 500. According to an embodiment, the dielectric layer 510 may be disposed to be spaced apart from the PCB 310, the antenna structure 501 may include an air gap between the dielectric layer 510 and the PCB 310, and this will be described later in more detail.

According to an embodiment, the antenna structure 501 may include a conductive layer 520 which is disposed on the dielectric layer 510, and which includes multiple openings 530 (for example, a first opening 532, a second opening 534, a third opening 536, and a fourth opening 538). According to an embodiment, the multiple openings 530 may be positioned to correspond to an antenna array (for example, the first antenna array 330 in FIG. 4B) disposed on the PCB 310. For example, the multiple openings 530 may have circular shapes, but are not limited thereto.

According to an embodiment, the conductive layer 520 may be formed by plating the dielectric layer 510. According to another embodiment (not illustrated), the conductive layer 520 may be formed integrally with the dielectric layer 510. For example, the conductive layer 520 may be attached to the dielectric layer 510 through a chemical process or a tape. According to an embodiment, the second surface (for example, the second surface 412 in FIG. 4B) of the PCB 310 may include a first region including a first antenna array 330 and a second region including a second antenna array 430, and the conductive layer 520 may be disposed in an region corresponding to the first region. This will be described later in more detail.

According to an embodiment, the size and/or circumferential length of at least some of the multiple openings 530 included in the conductive layer 520 may be determined based on the wavelength of signals emitted through an antenna array (for example, the first antenna array 330 in FIG. 4B) disposed on the PCB 310. For example, the circumference of at least some of the multiple openings 530 may be determined to be proportional to the wavelength of signals emitted by an antenna array (for example, the first antenna array 330 in FIG. 4B). This will be described later in more detail.

According to an embodiment, the RFIC 352 may control the first antenna array 330, the conductive layer 520, and/or the second antenna array 430, which are disposed on the PCB 310, thereby transmitting/receiving signals in a designated frequency band (for example, about 28 GHz and about 39 GHz). According to an embodiment, the RFIC 352 may control the first antenna array 330, the second antenna array 430, and the conductive layer 520 such that signals are emitted in a designated direction. For example, the RFIC 352 may control the first antenna array 330 and the conductive layer 520, which are disposed on the PCB 310, such that signals are emitted in the +z direction. The RFIC 352 may control the second antenna array 430 disposed on the PCB 310 and the conductive layer 520 such that signals in a designated frequency band are emitted in the +y direction.

Figure 6A:
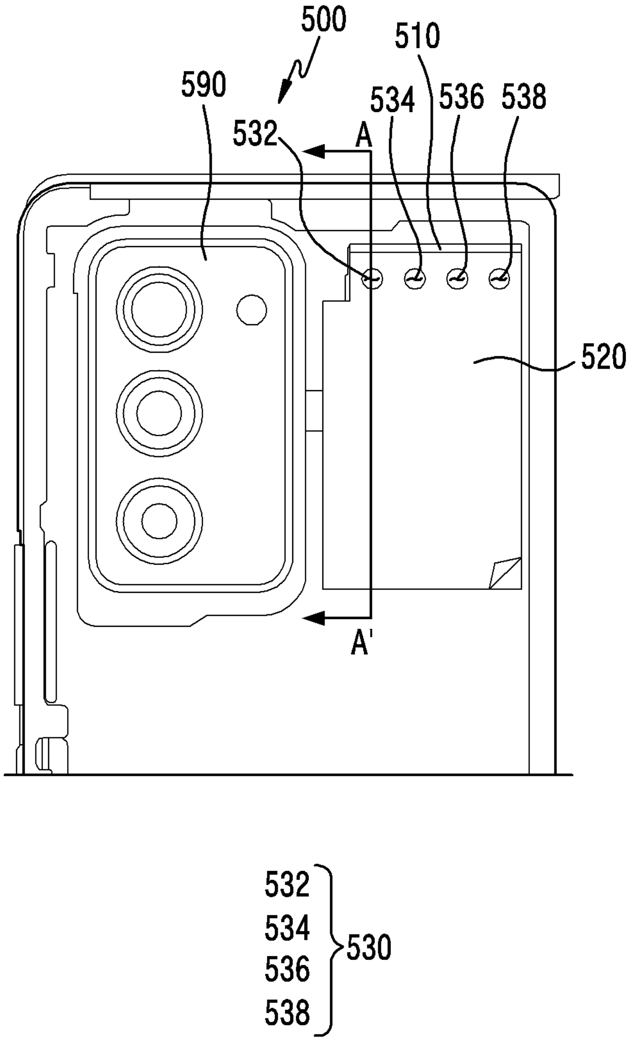
FIG. 6A illustrates the rear surface of an electronic device including an antenna structure according to an embodiment.
Figure 6B:
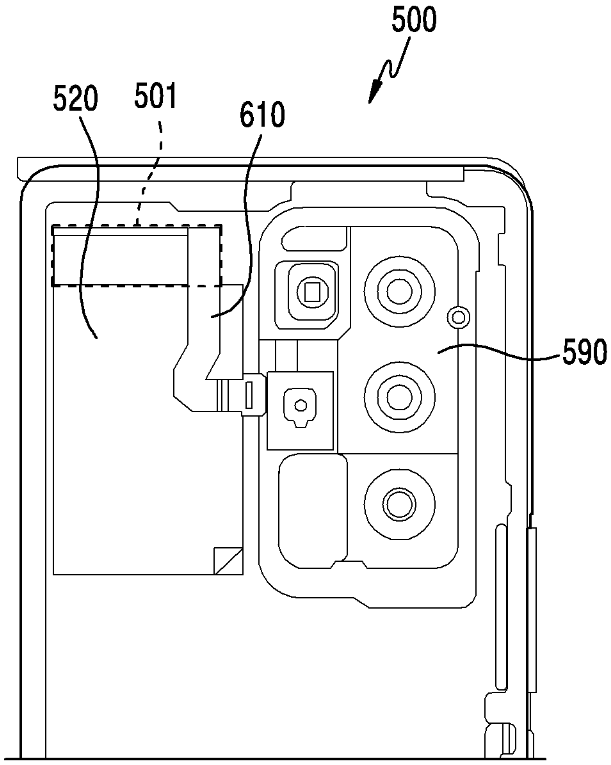
FIG. 6B illustrates the front surface of an electronic device including an antenna structure according to an embodiment.

FIG. 6A illustrates the rear surface of an electronic device including an antenna structure according to an embodiment. FIG. 6B illustrates the front surface of an electronic device including an antenna structure according to an embodiment.

Referring to FIG. 6A and FIG. 6B together, the electronic device 500 according to an embodiment may include an antenna structure 501 disposed therein. Components identical or substantially identical to those described above are given identical reference numerals, and repeated descriptions thereof will be omitted herein.

According to an embodiment, the antenna structure 501 may have a first size and may be disposed inside the electronic device 500. The antenna structure 501 may be disposed so as not to overlap the camera structure 590 in a direction perpendicular to the rear cover (for example, the rear cover 570 in FIG. 5) of the electronic device 500. According to an embodiment, the antenna structure 501 may be electrically connected to at least one electronic component (for example, an intermediate frequency integrated circuit (IFIC)) inside the electronic device 500 through an FPCB 610.

According to an embodiment, the dielectric layer 510 and/or the conductive layer 520 may have a second size which may be larger than the first size and may be disposed inside the electronic device 500. For example, the dielectric layer 510 and the conductive layer 520 may have a second size which is larger than the first size. As another example (not illustrated), the dielectric layer 510 may have a second size which is larger than the first size, and the conductive layer 520 may have the first size, but are not limited thereto. The size and disposition of the dielectric layer 510 and the conductive layer 520 according to various embodiments are not limited to those illustrated in FIG. 6A and FIG. 6B, and may be variously referred to, respectively.

According to an embodiment, the conductive layer 520 may contact the rear cover (for example, the rear cover 570 in FIG. 5) of the electronic device 500 or at least a part of the housing thereof. For example, the conductive layer 520 may contact at least some of the rear cover (for example, the rear cover 570 in FIG. 5) of the electronic device 500 such that heat generated by the antenna structure 501 is transferred to the rear cover 570 of the electronic device 500. According to another embodiment, the dielectric layer 510 may contact at least a part of the housing of the electronic device 500. For example, the dielectric layer 510 may contact at least a part of the housing of the electronic device 500 such that heat generated by the antenna structure 501 is transferred to at least a part of the housing.

Figure 7:
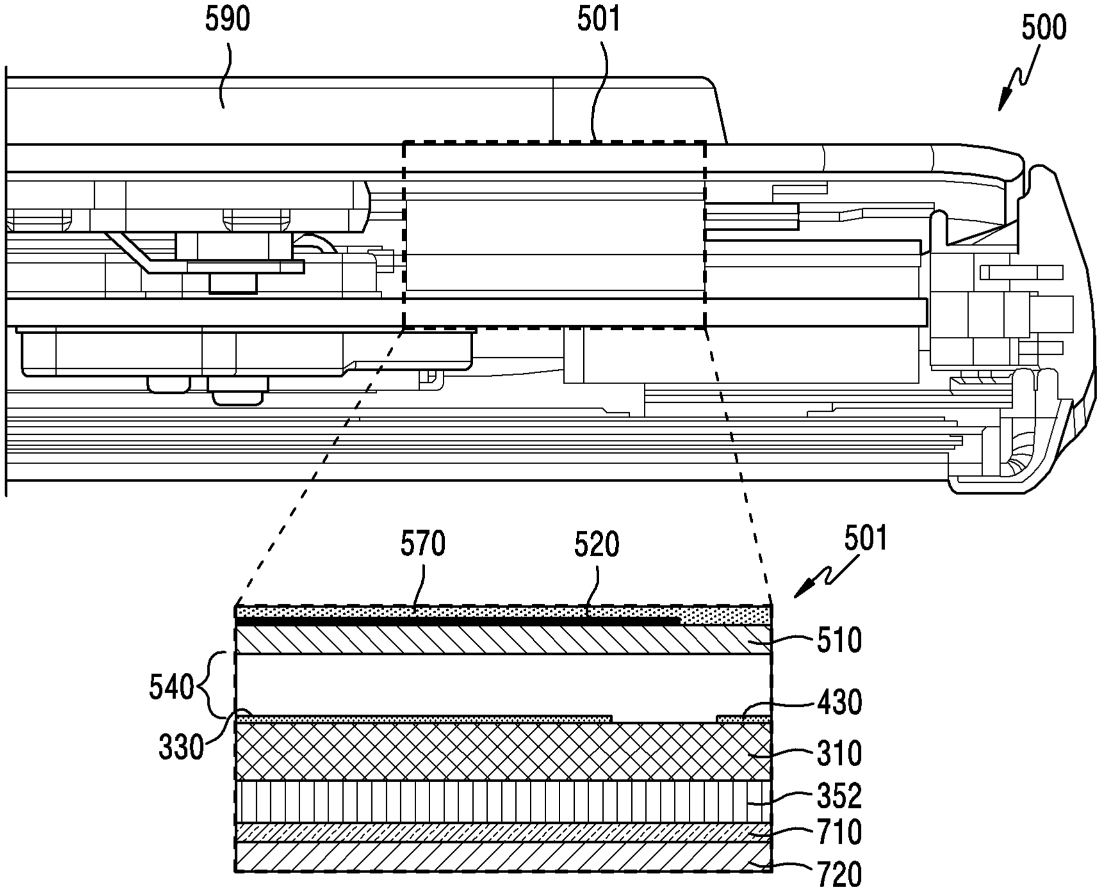
FIG. 7 is a sectional view of the electronic device and the antenna structure taken along line A-A' illustrated in FIG. 6A.

FIG. 7 is a sectional view of the electronic device and the antenna structure taken along line A-A' illustrated in FIG. 6A.

Referring to FIG. 7, the antenna structure 501 according to an embodiment may include a dielectric layer 510, a conductive layer 520, at least one antenna layer 330 and/or 430, a PCB 310, an air gap 540, an RFIC 352, a flexible printed circuit board (FPCB) 710, and/or a wireless communication circuit 720, and may be disposed inside the electronic device 500. According to another embodiment (not illustrated), some of the above-mentioned components (for example, the air gap 540) may be omitted, and another component may be added. Components identical or substantially identical to those described above are given identical reference numerals, and repeated descriptions thereof will be omitted herein.

According to an embodiment, the first antenna array 330 and/or the second antenna array 430 may be disposed on the PCB 310. According to an embodiment, the PCB 310 may include a first region including a first antenna array 330 and a second region including a second antenna array 430. This will be described later in more detail.

According to an embodiment, the conductive layer 520 may be disposed on a surface of the dielectric layer 510, which does not face the PCB 310. According to an embodiment, the conductive layer 520 may be disposed adjacent to the rear cover 570 of the electronic device 500. According to an embodiment, the conductive layer 520 may contact the rear cover 570. For example, the conductive layer 520 may be attached to a surface of the rear cover 570 through a conductive tape. According to another embodiment, the conductive layer 520 may be plated so as to contact the rear cover 570 and the dielectric layer 510.

According to an embodiment, the dielectric layer 510 may be disposed to be spaced apart from the PCB 310 and at least one antenna array 330 and/or 430 by a certain interval. According to an embodiment, the antenna structure 501 may include an air gap 540 between the dielectric layer 510 and the PCB 310 and at least one antenna array 330 or 430.

According to an embodiment, the PCB 310 and the RFIC 352 may be electrically connected to a wireless communication circuit 720 through an FPCB 710. According to an embodiment, the wireless communication circuit 720 may include a communication processor (CP) and an intermediate frequency integrated circuit (IFIC). The wireless communication circuit 720 according to an embodiment may control at least one antenna array 330 and/or 430 and the conductive layer 520 through the RFIC 352, thereby transmitting and/or receiving signals in a designated frequency band. For example, the wireless communication circuit 720 may feed the first antenna array 330 through the RFIC 352 and the PCB 310 such that the first antenna array 330 operates as a first emitter, and the conductive layer 520 operates as a second emitter. According to an embodiment, the first antenna array 330, the second antenna array 430, and the conductive layer 520 may operate as antenna emitters, respectively.

Figure 8:
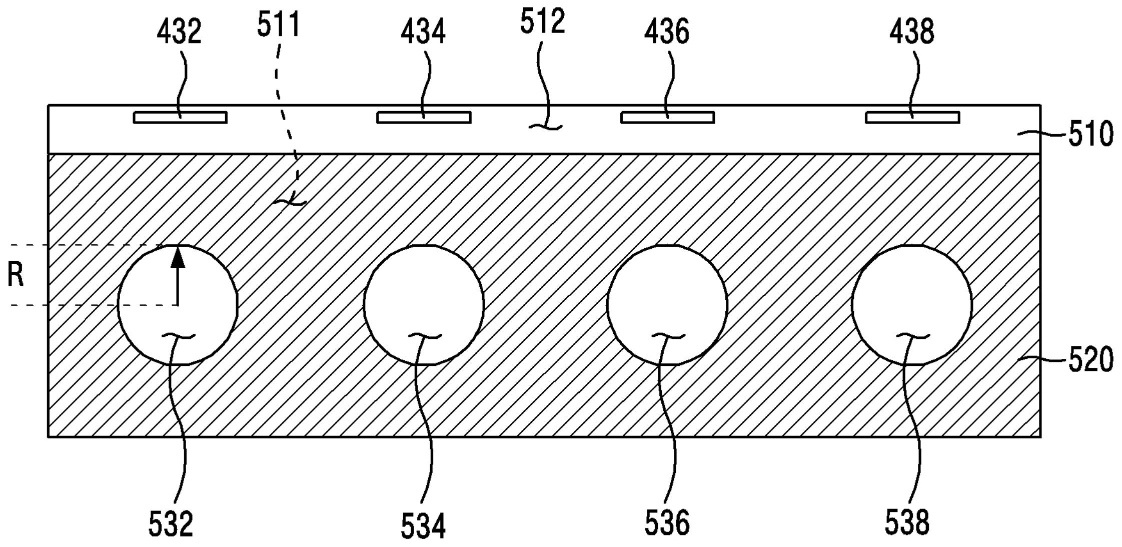
FIG. 8 is a top view of an antenna structure according to an embodiment.

FIG. 8 is a top view of an antenna structure according to an embodiment.

Referring to FIG. 8, the antenna structure 501 according to an embodiment may include a dielectric layer 510 and a conductive layer 520. Components identical or substantially identical to those described above are given identical reference numerals, and repeated descriptions thereof will be omitted herein.

According to an embodiment, the dielectric layer 510 may include a second region 512 corresponding to the region of the PCB 310, which may include the second antenna array 430, and a first region 511 other than the second region 512. According to an embodiment, the first region 511 of the dielectric layer 510 may correspond to the region of the PCB 310, which may include the first antenna array (for example, the first antenna array 330 in FIG. 4B).

According to an embodiment, the conductive layer 520 may be disposed in the region of the dielectric layer 510, which corresponds to the first region 511 of the PCB 310. According to an embodiment, multiple openings 530 included in the conductive layer 520 may be disposed in regions corresponding to elements (for example, the multiple elements 332, 334, 336, and 338 in FIG. 4B) of the first antenna array, respectively.

According to an embodiment, multiple openings 530 included in the conductive layer 520 may include circular shapes, but are not limited thereto, and may be referred to in various shapes. However, for convenience of description, it will be assumed in the following description that the multiple openings 530 have circular shapes.

According to an embodiment, the radius (R) of the multiple openings 530 may be determined based on the wavelength (λ) of signals emitted by the antenna structure 501 through the first antenna array (for example, the first antenna array 330 in FIG. 4B). According to an embodiment, the radius (R) and the circumferential length of the multiple openings 530 may be proportional to the wavelength (λ) of signals emitted by the antenna structure 501 through the first antenna array (for example, the first antenna array 330 in FIG. 4B). According to an embodiment, the radius (R) and the circumferential length of the multiple openings 530 may be determined within designated ranges. For example, the radius (R) of the multiple openings 530 may be determined as in the following equation:

$$\frac{\lambda}{2\pi}*0.25 \le R \le \frac{\lambda}{2\pi}*2 \quad \text{[Equation 1]}$$

For example, the radius (R) of the multiple openings 530 may be determined such that the circumferential length of the multiple openings 530 corresponds to 0.25-2 times the wavelength (λ), but is not limited thereto.

According to an embodiment, the antenna structure 501 may include a conductive layer 520 including multiple openings 530, thereby improving the range in which signals are emitted through the antenna structure 501, and the peak gain.

According to an embodiment, the antenna structure 501 may include a conductive layer 520 including multiple openings 530, thereby improving the range in which signals are emitted (for example, 50% value of cumulative density function (CDF50%)) (dBi), as shown in Table 1 below. It is assumed that the wavelength (λ) according to an embodiment, the length of 1λ is 7.76 mm.

TABLE 1

| | CDF50% (dBi) | | | | | | |
|---|---|---|---|---|---|---|---|
| Frequency | | | | | Delta (dB) | | |
| (GHz) | Conventional | 1λ | 1.25λ | 1.5λ | 1λ | 1.25λ | 1.5λ |
| 37 | −2.98 | −1.81 | −2.07 | −2.23 | 1.17 | 0.91 | 0.75 |
| 38.5 | −2.30 | −1.40 | −1.81 | −1.82 | 0.89 | 0.49 | 0.48 |
| 40 | −2.64 | −2.24 | −2.30 | −2.35 | 0.40 | 0.34 | 0.29 |

Referring to Table 1, in the case of communication in a 37 GHz band, the range of emission may be improved by 0.91 when including a conductive layer 520 including multiple openings 530, the circumferential length of which corresponds to 1.25 times the wavelength, compared with when no conductive layer 520 is included.

According to an embodiment, the antenna structure 501 may include a conductive layer 520 including multiple openings 530, thereby improving the peak gain (dBi) of emitted signals, as shown in Table 2 below. It is assumed that the wavelength (λ) according to an embodiment, the length of 1λ is 7.76 mm.

TABLE 2

| | Peak Gain (dBi) | | | | | | |
|---|---|---|---|---|---|---|---|
| Frequency | | | | | Delta (dB) | | |
| (GHz) | Conventional | 1λ | 1.25λ | 1.5λ | 1λ | 1.25λ | 1.5λ |
| 37 | 9.18 | 9.33 | 9.42 | 9.49 | 0.15 | 0.24 | 0.31 |
| 38.5 | 8.90 | 9.61 | 10.08 | 10.26 | 0.71 | 1.18 | 1.36 |
| 40 | 9.09 | 9.97 | 10.20 | 10.51 | 0.88 | 1.11 | 1.42 |

Referring to Table 2, in the case of communication in a 40 GHz band, the peak gain may be improved by 1.42 when including a conductive layer 520 including multiple openings 530, the circumferential length of which corresponds to 1.5 times the wavelength, compared with when no conductive layer 520 is included.

Figure 9A:
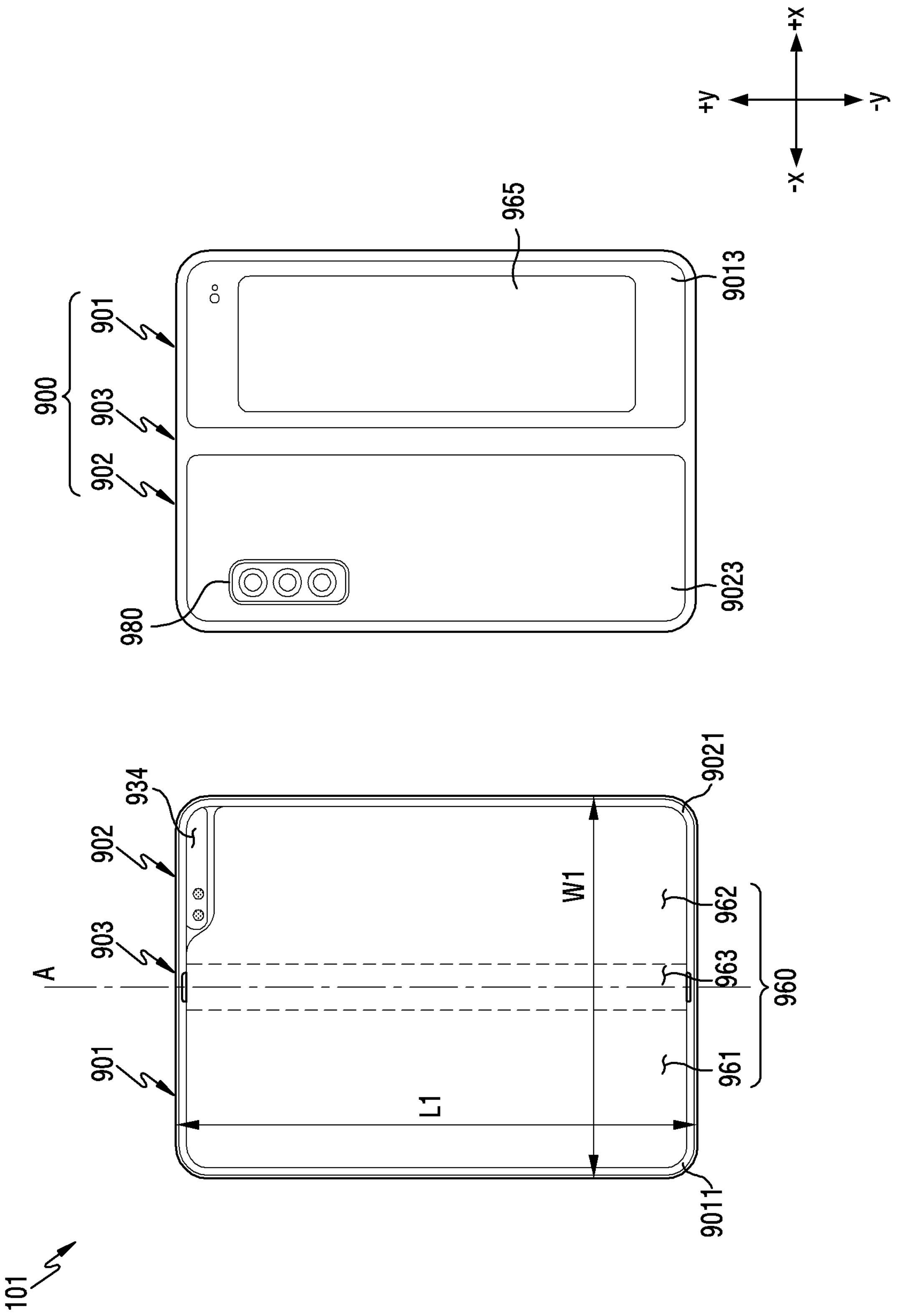
FIG. 9A illustrates a front view and a rear view of an electronic device in an unfolded state according to an embodiment.
Figure 9B:
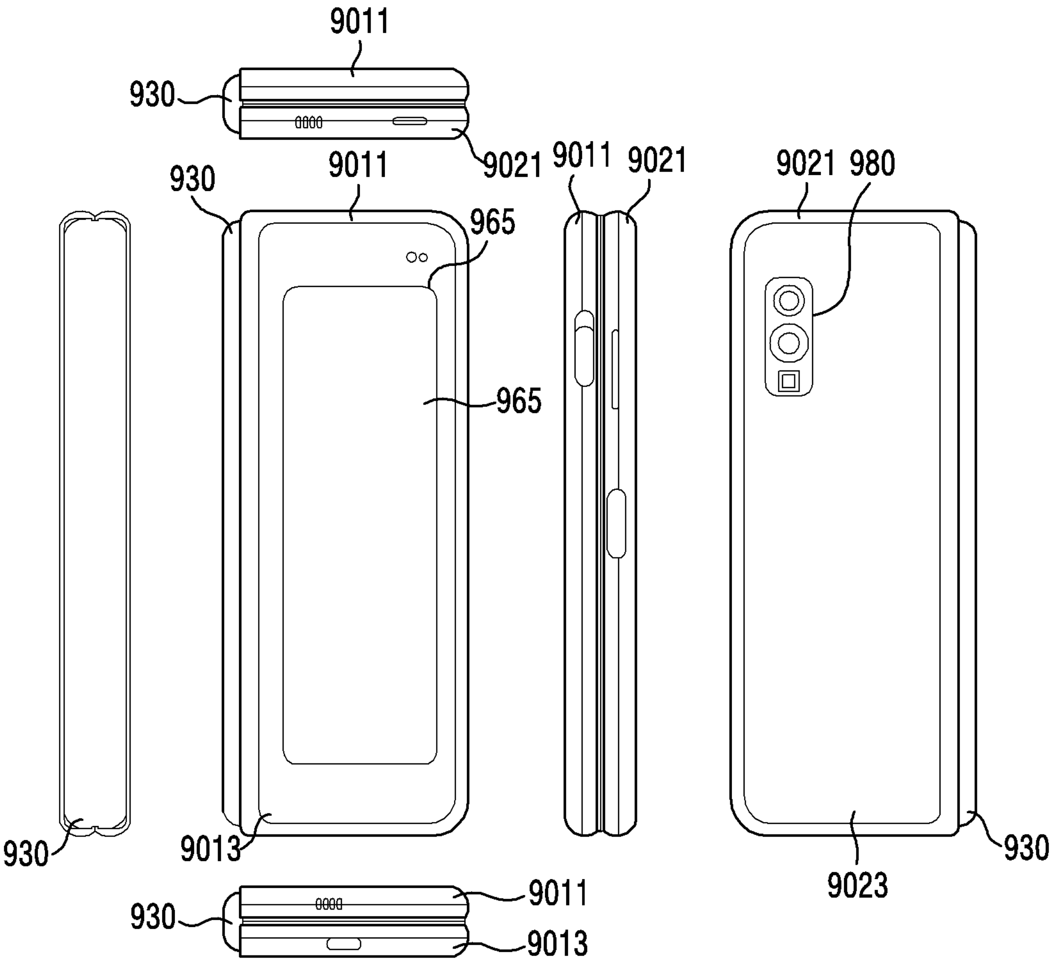
FIG. 9B illustrates a front view, a rear view, a top view, a bottom view and side views of an electronic device in a folded state according to an embodiment.

FIG. 9A illustrates an electronic device 101 in an unfolded state according to an embodiment. FIG. 9B illustrates an electronic device 101 in a folded state according to an embodiment.

Referring to FIG. 9A and FIG. 9B, in an embodiment, the electronic device 101 may include a foldable housing 900 (hereinafter, abbreviated to “housing” 900) and a flexible or foldable display 960 (hereinafter, abbreviated to “display” 960) disposed in a space formed by the housing 900. In the disclosure, the surface on which the display 960 is disposed is defined as a first surface or the front surface of the electronic device 101. In addition, the opposite surface of the front surface is defined as a second surface or the rear surface of the electronic device 101. Furthermore, a surface surrounding the space between the front surface and the rear surface is defined as a third surface or a lateral surface of the electronic device 101.

In an embodiment, the housing 900 may have a substantially rectangular shape in the unfolded state shown in FIG. 9A. For example, the housing 900 may have a designated width W1 and a designated length L1 which may be larger than the designated width W1. As another example, the housing 900 may have a designated width W1 and a designated length L1, wherein the designated length L1 may be substantially identical to or smaller than the designated width W1. For example, the designated width W1 may be the width of the display 960. In an embodiment, the housing 900 of the electronic device 101 may be folded or unfolded with reference to a folding axis A which may be substantially parallel to a long side of the rectangle (for example, along the sides of the housing 900 of the electronic device 101 in FIG. 9A, a side facing in the y-axis direction).

In an embodiment, the housing 900 may include a first part 901, a second part 902, and a connecting portion 903. The connecting portion 903 may be disposed between the first part 901 and the second part 902. The connecting portion 903 may be coupled to the first part 901 and the second part 902, and the first part 901 and/or the second part 902 may rotate around the connecting portion 903 (or the folding axis A).

In an embodiment, the first part 901 may include a first lateral member 9011 and a second rear cover 9013. In an embodiment, the second part 902 may include a second lateral member 9021 and a second rear surface 9023.

In an embodiment, the first lateral member 9011 may extend along a side of the first part 901, and may form at least a part of a lateral surface of the electronic device 101. The first lateral member 9011 may include at least one conductive portion made of a conductive material (for example, a metal). The conductive portion may operate as an antenna emitter for transmitting and/or receiving RF signals. Similarly to the first lateral member 9011, the second lateral member 9021 may form a part of the lateral surface of the electronic device 101, and at least a part of the second lateral member 9021 may be made of a conductive material so as to operate as an antenna emitter.

In an embodiment, the first lateral member 9011 and the second lateral member 9021 may be disposed on both sides of the folding axis A, respectively, and may have substantially symmetric shapes with regard to the folding axis A.

In an embodiment, the angle or distance between the first lateral member 9011 and the second lateral member 9021 may vary according to whether the electronic device 101 is in an unfolded state, in a folded state, or in an intermediate state.

In an embodiment, the housing 900 may form a recess in which the display 960 is contained. The recess may correspond to the shape of the display 960.

In an embodiment, a sensor region 934 may be formed to have a certain region adjacent to a corner of the second part 902. However, the disposition, shape, and size of the sensor region 934 are not limited to the illustrated example. For example, in another embodiment, the sensor region 934 may be provided at another corner of the housing 900 or in a specific region between the top corner and the bottom corner. As another example, the sensor region 934 may be omitted. For example, components disposed in the sensor region 934 may be disposed under the display 960 or in another position in the housing 900. In an embodiment, components embedded in the electronic device 101 to perform various functions may be exposed to the front surface of the electronic device 101 through the sensor region 934 and/or through one or more openings provided in the sensor region 934. In various embodiments, the components may include various kinds of sensors. The sensor may include, for example, at least one of a front camera, a receiver, or a proximity sensor.

In an embodiment, the first rear cover 9013 may be disposed on the first part 901 on the rear surface of the electronic device 101. The first rear cover 9013 may have a substantially rectangular side. Similarly, to the first rear cover 9013, the second rear cover 9023 may be disposed on the second part 902 on the rear surface of the electronic device 101.

In an embodiment, the first rear cover 9013 and the second rear cover 9023 may have substantially symmetric shapes around the folding axis A. However, the first rear cover 9013 and the second rear cover 9023 may not necessarily have mutually symmetric shapes, and in another embodiment, the electronic device 101 may include a first rear cover 9013 and/or a second rear cover 9023 in various shapes. In another embodiment, the first rear cover 9013 may be formed integrally with the first lateral member 9011, and the second rear cover 9023 may be formed integrally with the second lateral member 9021.

In an embodiment, the first rear cover 9013, the second rear cover 9023, the first lateral member 9011, and the second lateral member 9021 may form a space in which various components (for example, a printed circuit board or a battery) of the electronic device 101 may be disposed.

In an embodiment, one or more components may be disposed on the rear surface of the electronic device 101 or visually exposed thereto. For example, at least a part of the sub display 965 may be visually exposed through at least one region of the first rear cover 9013. As another example, the rear camera 980 may be visually exposed through at least one region of the second rear cover 9023. As another example, the rear camera 980 may be disposed in a region on the rear surface of the electronic device 101.

The housing 900 of the electronic device 101 is not limited to the shape and coupling illustrated in FIG. 9A and FIG. 9B and may be implemented by a combination and/or coupling of other shapes and/or components.

Referring to FIG. 9B, the connecting portion 903 may be implemented such that the first part 901 and the second part 902 can rotate with regard to each other. For example, the connecting portion 903 may include a hinge structure coupled to the first part 901 and the second part 902. In an embodiment, the connecting portion 903 may include a hinge cover 930 disposed between the first lateral member 9011 and the second lateral member 9021 to cover an internal component (for example, the hinge structure). In an embodiment, the hinge cover 930 may be covered by a part of the first lateral member 9011 and/or the second lateral member 9021 and/or exposed to the outside according to the state of the electronic device 101 (for example, a flat state or a folded state).

For example, when the electronic device 101 is in a flat state as illustrated in FIG. 9A, at least a part of the hinge cover 930 may be covered by the first lateral member 9011 and the second lateral member 9021 and thus not exposed. For example, when the electronic device 101 is in a folded state as illustrated in FIG. 9B, the hinge cover 930 may be exposed to the outside between the first lateral member 9011 and the second lateral member 9021. For example, in an intermediate state in which the first lateral member 9011 and the second lateral member 9021 are folded with a certain angle, a part of the hinge cover 930 may be exposed to the outside between the first lateral member 9011 and the second lateral member 9021. However, in this case, the exposed area of the hinge cover 930 may be smaller than that in the fully folded state in FIG. 9B.

In an embodiment, the display 960 may be disposed in a space formed by the housing 900. For example, the display 960 may be seated in a recess formed by the housing 900 to form the majority of the front surface of the electronic device 101. For example, the front surface of the electronic device 101 may include the display 960 and a partial region of the first lateral member 9011 and a partial region of the second lateral member 9021, which are adjacent to the display 960. As another example, the rear surface of the electronic device 101 may include the first rear cover 9013, a partial region of the first lateral member 9011 adjacent to the first rear cover 9013, the second rear cover 9023, and a partial region of the second lateral member 9021 adjacent to the second rear cover 9023.

In an embodiment, the display 960 may include a flexible display, at least a partial region of which may be deformed to be flat or curved. In an embodiment, the display 960 may include a folding region 963, a first region 961, and a second region 962. The folding region 963 may extend along the folding axis A, the first region 961 may be disposed on one side with reference to the folding region 963, and the second region 962 may be disposed on the other side. As another example, the first region 961 may be disposed on the first part 901, and the second region 962 may be disposed on the second part 902. The folding region 963 may be disposed on the connecting portion 903.

The region division of the display 960 illustrated in FIG. 9A and FIG. 9B is an embodiment, and the display 960 may be divided into multiple (for example, four or more, or two) regions according to the structure or function. For example, regions of the display 960 may be divided by the folding region 963 and/or the folding axis A in the embodiment illustrated in FIG. 9A and FIG. 9B, regions of the display 960 may be divided by a different folding region and/or a different folding axis in another embodiment.

In an embodiment, the first region 961 and the second region 962 may have symmetric shapes as a whole around the folding region 963. However, the second region 962 may include a notch that has been cut according to whether the sensor region 434 exists, unlike the first region 961, but may have a shape symmetric to the first region 961 in other regions. For example, the first region 961 and the second region 962 may include mutually symmetrically shaped portions and mutually asymmetrically shaped portions.

Hereinafter, operations of the first lateral member 9011 and the second lateral member 9021 and respective regions of the display 960 may be described according to the state of the electronic device 101 (for example, a flat state and a folded state).

In an embodiment, when the electronic device 101 is in a flat state (for example, FIG. 9A), the first lateral member 9011 and the second lateral member 9021 may be disposed to face in an identical direction with an angle of about 180° therebetween. The surface of the first region 961 of the display 960 and the surface of the second region 962 thereof may form about 180° with each other, and may face in a substantially identical direction (for example, in the forward direction of the electronic device). The folding region 963 may form an identical plane with the first region 961 and the second region 962.

In an embodiment, when the electronic device 101 is in a folded state (for example, FIG. 9B), the first lateral member 9011 and the second lateral member 9021 may be disposed to face each other. The surface of the first region 961 of the display 960 and the surface of the second region 962 thereof may form a narrow angle (for example, between about 0° and about 10°) with each other, and may face each other. At least a part of the folding region 963 may be configured as a curved surface having a certain curvature.

In an embodiment, when the electronic device 101 is in an intermediate state, the first lateral member 9011 and the second lateral member 9021 may be disposed at a certain angle with each other. The surface of the first region 961 of the display 960 and the surface of the second region 962 thereof may form an angle larger than that in the folded state and smaller than that in the unfolded state. At least a part of the folding region 963 may be configured as a curved surface having a certain curvature, and the curvature may be smaller than that in the folded state.

Figure 10A:
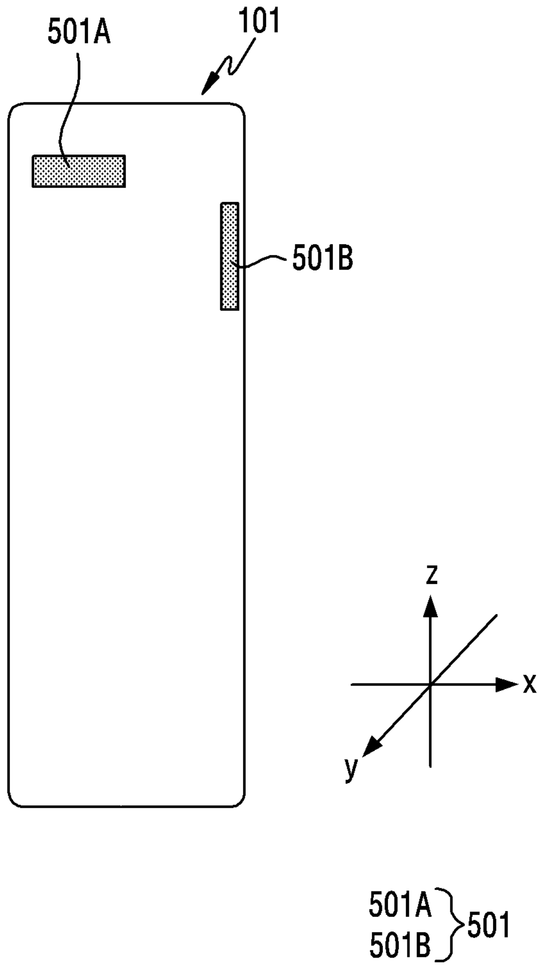
FIG. 10A illustrates an antenna structure mounted on an electronic device in a folded state according to an embodiment.
Figure 10B:
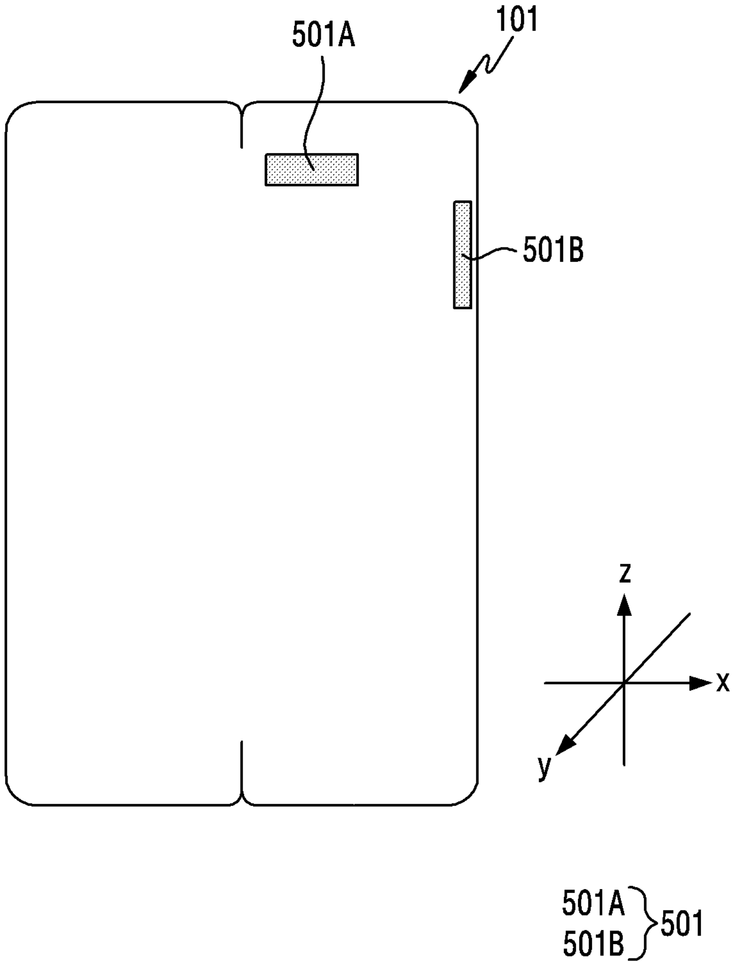
FIG. 10B illustrates an antenna structure mounted on an electronic device in an unfolded state according to an embodiment.

FIG. 10A illustrates an antenna structure 501 mounted on an electronic device 101 in a folded state according to an embodiment. FIG. 10B illustrates an antenna structure 501 mounted on an electronic device 101 in an unfolded state according to an embodiment.

Referring to FIG. 9A, FIG. 9B, FIG. 10A, and FIG. 10B together, the antenna structure 501 according to an embodiment may be disposed inside the housing 900 of the electronic device 101. According to an embodiment, the antenna structure 501 may include a first antenna structure 501A and a second antenna structure 501B. The structure of the first antenna structure 501A and the second antenna structure 501B may be referred to by the antenna structure 501 in FIG. 5. Components identical or substantially identical to those described above are given identical reference numerals, and repeated descriptions thereof will be omitted herein.

According to an embodiment, the first antenna structure 501A and the second antenna structure 501B may be disposed inside at least one of the first part 901 or the second part 902. According to another embodiment (not illustrated), the first antenna structure 501A may be disposed on the first part 901, and the second antenna structure 501B may be disposed on the second part 902, but the disposition of the antenna structure 501 is not limited to the above-mentioned example. For convenience of description, it will be assumed in the following description that the first antenna structure 501A and the second antenna structure 501B are disposed on the first part 901.

According to an embodiment, the first antenna structure 501A may be disposed inside the first part 901 such that the first antenna array (for example, the first antenna array 330 in FIG. 4A) and/or the conductive layer (for example, the conductive layer 520 in FIG. 5) may face the rear surface of the electronic device 101. The first antenna structure 501A may emit signals in a first direction (for example, +y direction) perpendicular to the rear surface of the electronic device 101 through the first antenna array and the conductive layer. The first antenna structure 501A may emit signals in a second direction (for example, +z direction) perpendicular to the first direction through the second antenna array (for example, the second antenna array 430 in FIG. 5).

According to an embodiment, the second antenna structure 501B may be disposed inside the first part 901 such that the first antenna array (for example, the first antenna array 330 in FIG. 4A) and/or the conductive layer (for example, the conductive layer 520 in FIG. 5) may face the lateral surface of the electronic device 101. The second antenna structure 501B may emit signals in a third direction (for example, +x direction) perpendicular to the lateral surface of the electronic device 101 through the first antenna array and the conductive layer. The second antenna structure 501B may emit signals in a fourth direction (for example, −y direction) perpendicular to the third direction through the second antenna array (for example, the second antenna array 430 in FIG. 5).

An antenna structure according to an embodiment may include a printed circuit board (PCB), a radio frequency integrated circuit (RFIC) disposed on a first surface of the PCB, a first antenna disposed on a second surface parallel to the first surface of the PCB, the first antenna including multiple conductive patches, a dielectric layer disposed to be adjacent to the second surface and parallel to the second surface, and/or a conductive layer disposed on the dielectric layer, wherein the conductive layer may include multiple openings formed in a region corresponding to the multiple conductive patches. The RFIC may transmit/receive signals of a designated frequency through the first antenna and/or the conductive layer.

According to an embodiment, the antenna structure may include an air gap between the dielectric layer and the second surface.

According to an embodiment, the antenna structure may include a connector disposed on the first surface of the PCB and connected to an electric connecting member.

According to an embodiment, the multiple openings may have a circular shape.

According to an embodiment, the circumferential length of the multiple openings may be proportional to the wavelength of the signals.

According to an embodiment, the antenna structure may further include a second antenna disposed on the second surface of the PCB, the second antenna including a dipole antenna corresponding to the multiple conductive patches.

According to an embodiment, the RFIC may transmit/receive signals of the designated frequency through the first antenna, the second antenna, and/or the conductive layer.

According to an embodiment, the RFIC may transmit/receive the signals in a first direction through the first antenna and/or the conductive layer, and transmit/receive the signals in a second direction perpendicular to the first direction through the second antenna.

According to an embodiment, the second surface of the PCB may include a first region including the first antenna and a second region including the second antenna, and the conductive layer may be disposed in a region of the dielectric layer, which corresponds to the first region.

According to an embodiment, the designated frequency may include at least one of 28 GHz or 39 GHz.

An electronic device according to an embodiment may include a housing, a wireless communication circuit disposed inside the housing, and/or an antenna structure electrically connected to the wireless communication circuit. The antenna structure may include a printed circuit board (PCB), a radio frequency integrated circuit (RFIC) disposed on a first surface of the PCB, a first antenna disposed on a second surface parallel to the first surface of the PCB, the first antenna including multiple conductive patches, a dielectric layer disposed to be adjacent to the second surface and parallel to the second surface, and/or a conductive layer disposed on the dielectric layer, the conductive layer including multiple openings formed in a region corresponding to the multiple conductive patches. The wireless communication circuit may transmit/receive signals in a designated frequency domain through the first antenna and/or the conductive layer.

The housing according to an embodiment may include a first housing structure including a first lateral member configured to form at least a part of a lateral surface of the electronic device, a second housing structure including a second lateral member configured to form at least a part of the remaining region of the lateral surface, and a hinge structure configured to connect the first housing structure and the second housing structure. The housing can switch to a folded state or an unfolded state around the hinge structure. The electronic device according to an embodiment may include a flexible display disposed in a space formed by the housing and configured to form the front surface of the electronic device in the unfolded state of the electronic device. The flexible display may include a first region corresponding to the first housing structure and a second region corresponding to the second housing structure. The first region and the second region may face each other in the folded state of the electronic device.

According to an embodiment, the antenna structure may be disposed inside the housing such that the second surface of the PCB faces the rear surface of the electronic device.

According to an embodiment, the electronic device may further include a second antenna on the second surface of the PCB, wherein the second antenna may include a dipole antenna corresponding to the multiple conductive patches. The wireless communication circuit may transmit/receive the signals in a first direction perpendicular to the rear surface through the first antenna, and transmit/receive the signals in a second direction perpendicular to the first direction through the second antenna.

According to an embodiment, the multiple openings may have a circular shape.

According to an embodiment, the circumferential length of the multiple openings may be proportional to the wavelength of the signals.

According to an embodiment, the second surface of the PCB may include a first region including the first antenna and a second region including the second antenna. The conductive layer may be disposed in a region of the dielectric layer, which corresponds to the first region.

According to an embodiment, the PCB may have a first size, and the dielectric layer and/or the conductive layer may have a second size which may be larger than the first size.

According to an embodiment, at least some of the conductive layer and/or the dielectric layer may contact at least a part of the housing.

According to an embodiment, the conductive layer and/or the dielectric layer may transfer heat generated by the PCB and the RFIC to the housing.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated about 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiments disclosed herein.

The invention claimed is:

1. An antenna structure comprising:

a printed circuit board (PCB);

a radio frequency integrated circuit (RFIC) disposed on a first surface of the PCB;

a first antenna disposed on a second surface of the PCB parallel to the first surface of the PCB, the first antenna comprising multiple conductive patches;

a dielectric layer disposed to be adjacent to the second surface of the PCB and parallel to the second surface of the PCB; and a conductive layer disposed on the dielectric layer, the conductive layer comprising multiple openings formed in a region corresponding to the multiple conductive patches, wherein the RFIC is configured to transmit/receive signals of a designated frequency through the first antenna and the conductive layer, wherein the signals of a designated frequency include a signal wavelength.

2. The antenna structure of claim 1, further comprising an air gap between the dielectric layer and the second surface of the PCB.

3. The antenna structure of claim 1, further comprising a connector disposed on the first surface of the PCB and connected to an electric connecting member.

4. The antenna structure of claim 1, wherein the multiple openings have a circular shape and include a circumferential length of the multiple openings.

5. The antenna structure of claim 4, wherein the circumferential length of the multiple openings is proportional to the signal wavelength.

6. The antenna structure of claim 1, further comprising a second antenna on the second surface of the PCB, the second antenna comprising a dipole antenna corresponding to the multiple conductive patches.

7. The antenna structure of claim 6, wherein the RFIC is configured to transmit/receive the signals of a designated frequency through the first antenna, the second antenna, and the conductive layer.

8. The antenna structure of claim 6, wherein the RFIC is configured to:

transmit/receive the signals of a designated frequency in a first direction through the first antenna and the conductive layer; and transmit/receive the signals of a designated frequency in a second direction perpendicular to the first direction through the second antenna.

9. The antenna structure of claim 6, wherein the second surface of the PCB comprises a first region comprising the first antenna and a second region comprising the second antenna, and wherein the conductive layer is disposed in a region of the dielectric layer, which corresponds to the first region.

10. The antenna structure of claim 1, wherein the designated frequency comprises at least one of about 28 GHz and about 39 GHz.

11. An electronic device comprising:

a housing;

a wireless communication circuit disposed inside the housing; and an antenna structure electrically connected to the wireless communication circuit, wherein the antenna structure comprises:

a printed circuit board (PCB);

a radio frequency integrated circuit (RFIC) disposed on a first surface of the PCB;

a first antenna disposed on a second surface of the PCB parallel to the first surface of the PCB, the first antenna comprising multiple conductive patches;

a dielectric layer disposed to be adjacent to the second surface of the PCB and parallel to the second surface of the PCB; and a conductive layer disposed on the dielectric layer, the conductive layer comprising multiple openings formed in a region corresponding to the multiple conductive patches, and wherein the wireless communication circuit is configured to transmit/receive signals in a designated frequency domain through the first antenna and the conductive layer.

12. The electronic device of claim 11, wherein the housing comprises a first housing structure comprising a first lateral member configured to form at least a part of a lateral surface of the electronic device, a second housing structure comprising a second lateral member configured to form at least a part of the remaining region of the lateral surface, and a hinge structure configured to connect the first housing structure and the second housing structure, wherein the housing can switch to a folded state or an unfolded state around the hinge structure, and wherein the electronic device comprises a flexible display disposed in a space formed by the housing and configured to form the front surface of the electronic device in the unfolded state, the flexible display comprising a first region corresponding to the first housing structure and a second region corresponding to the second housing structure, and the first region and the second region face each other in the folded state.

13. The electronic device of claim 11, further comprising a second antenna on the second surface of the PCB, the second antenna comprising a dipole antenna corresponding to the multiple conductive patches, wherein the wireless communication circuit is configured to transmit/receive the signals in a designated frequency domain in a first direction perpendicular to the second surface of the PCB through the first antenna, and transmit/receive the signals in a second direction perpendicular to the first direction through the second antenna.

14. The electronic device of claim 11, wherein the multiple openings have a circular shape.

15. The electronic device of claim 14, wherein the circumferential length of the multiple openings is proportional to the wavelength of the signals in a designated frequency domain.

16. The electronic device of claim 11, wherein the second surface of the PCB comprises a first region comprising the first antenna and a second region comprising the second antenna, and wherein the conductive layer is disposed in a region of the dielectric layer which corresponds to the first region.

17. The electronic device of claim 11, wherein the PCB has a first size, and wherein at least one of the conductive layer or the dielectric layer have a second size larger than the first size.

18. The electronic device of claim 17, wherein at least a portion of the conductive layer or the dielectric layer is in contact with at least a portion of the housing.

19. The electronic device of claim 18, wherein at least one of the conductive layer or the dielectric layer is configured to transfer heat generated in the PCB to the housing.

20. The electronic device of claim 18, wherein at least one of the conductive layer or the dielectric layer is configured to transfer heat generated in the RFIC to the housing.

* * * * *